United States Patent
Haines et al.

(10) Patent No.: US 10,801,824 B1
(45) Date of Patent: Oct. 13, 2020

(54) MULTI-FUNCTION GAUGE BLOCK

(71) Applicants: David Alan Haines, Fort Walton Beach, FL (US); Donald William Laux, Fort Walton Beach, FL (US)

(72) Inventors: David Alan Haines, Fort Walton Beach, FL (US); Donald William Laux, Fort Walton Beach, FL (US)

(*) Notice: Subject to any disclaimer, the term of this patent is extended or adjusted under 35 U.S.C. 154(b) by 232 days.

(21) Appl. No.: 16/054,995

(22) Filed: Aug. 3, 2018

(51) Int. Cl.
  *G01B 3/30* (2006.01)
  *G01G 21/26* (2006.01)

(52) U.S. Cl.
  CPC ............ *G01B 3/30* (2013.01); *G01G 21/26* (2013.01)

(58) Field of Classification Search
  CPC .................................. G01B 3/30; G01G 21/26
  USPC .......................................................... 33/567
  See application file for complete search history.

(56) References Cited

U.S. PATENT DOCUMENTS

| | | | |
|---|---|---|---|
| 70,531 A | 11/1867 | Comstock | |
| 741,146 A | 10/1903 | Labofish | |
| 1,306,254 A * | 6/1919 | Deck | B25H 1/0007 269/296 |
| 1,407,833 A | 2/1922 | Blood | |
| 2,039,141 A | 4/1936 | Brault | |
| 2,105,054 A * | 1/1938 | Posthuma | G01B 3/56 33/471 |
| 2,208,371 A | 7/1940 | Johansson | |
| 2,469,502 A * | 5/1949 | Hallin | G01B 3/30 33/567 |
| 2,487,667 A * | 11/1949 | Nippert | G01B 3/30 33/567 |
| 2,536,401 A * | 1/1951 | Victor | G01B 3/30 33/567 |
| 2,601,630 A * | 6/1952 | Rahn | G01B 3/30 451/41 |
| 2,772,483 A | 12/1956 | Gierlich | |
| 2,831,256 A * | 4/1958 | Werle | G01B 3/30 33/567 |
| 3,845,560 A * | 11/1974 | Sommer | G01B 3/30 33/567 |
| 3,908,278 A * | 9/1975 | Sundahl | G01B 3/30 33/502 |
| 5,109,609 A * | 5/1992 | Anderson | G01B 3/30 33/501.05 |
| 5,231,768 A * | 8/1993 | Beckwith, Jr. | G01B 3/30 33/567 |
| 5,329,703 A * | 7/1994 | Craig | G01B 5/242 33/502 |
| 6,552,280 B1 | 4/2003 | Tellenbach | |
| 6,901,672 B1 | 6/2005 | Reilly | |

FOREIGN PATENT DOCUMENTS

SE        17017        5/1901

* cited by examiner

*Primary Examiner* — Christopher W Fulton
(74) *Attorney, Agent, or Firm* — Peter Loffler

(57) ABSTRACT

A multi-function gauge block has a rectangular body member with four side faces and two end faces that define outside measuring faces which define a precise length therebetween and which can be wrung to other gauge blocks or to a platen. An angle face extends between two of the side faces and forms a precise angle between itself and one or both of these side faces. The angle face is bounded by a pair of inside measuring faces that define a precise length therebetween. The multi-function gauge block has a precise mass so that it can be used as a calibration weight.

14 Claims, 5 Drawing Sheets

MULTI-FUNCTION GAUGE BLOCK

BACKGROUND OF THE INVENTION

1. Field of the Invention

The present invention relates to a gauge block wherein the gauge block, in addition to providing a precision length, also provides a precise angular measurement and also functions as a calibration weight.

2. Background of the Prior Art

The gauge block, also called a gage block, slip block, or a Johansson or Jo block among other names, is a rectangular block of metal that is a practical length standard (end standard) which is used for length calibration or as a dimensional reference for measuring tools and instruments. A gauge block is made from metal (or possibly ceramic) and is rectangular in shape, having a pair of opposing measuring faces that are finished to be precisely flat and parallel with one another, with the precision length being between these two measuring faces. Additionally, gauge blocks can be wrung together (to remove excess air between the blocks) or stacked for an overall length that is the distance between the outer measuring face of the top block and a platen upon which the bottom block rests, the platen being made from the same material used to form the gauge blocks.

Gauge blocks have high dimensional accuracy, low secular variation, have excellent resistance to abrasion, are not prone to rust or corrosion, and have a thermal expansion that is close to the typical materials upon which the gauge block is to be used.

Gauge blocks typically come in lengths from 0.5 mm to 1 meter and typically come as a set of varying length gauge blocks. Gauge blocks come in varying grades of accuracy as set by either the ISO (International Organization for Standardization), the ASME (American Society of Mechanical Engineers), or, more recently under U.S. Federal Specification GGG-G-15C, the particular grade of gauge block selected being dependent on the particular job at hand.

Angular gauge blocks are used to measure precision angles in various fields such as meteorology, in making die sets, and in measuring angles of precision cutting blades. Angular gauge blocks are similar to standard gauge blocks used to measure length in that they are made from similar materials and can be wrung together to add or subtract individual angles together to form the desired angle of measurement. Some gauge block sets include both length gauge blocks and angular gauge blocks, although such sets tend to be bulky in their overall physical size.

Calibration weights are bodies that have a precise mass under certain conditions and are used to calibrate scales. Like gauge blocks, calibration weights come in varying degrees of precision depending on the calibration job at hand.

While both gauge blocks of both types and calibration weights are invaluable tools in many settings, there is room for improvement in each. Specifically, many, if not all gauge blocks in a gauge block set should have multiple functions in order to reduce the overall size of a given gauge block set so as to make the transport of such sets relatively easier and to reduce the overall cost for the functionality provided.

SUMMARY OF THE INVENTION

The multi-function gauge block of the present invention addresses the aforementioned needs in the art by providing a gauge block, that forms part of a gauge block set, wherein the gauge block has a series of functions, including its standard length measurement function, an angular measurement function, and a precision weight measuring function (calibration weight), all while retaining the typical features of a present day gauge block including precision to one of the certification organizations or codes and the ability to wring one or more gauge blocks together. The multi-function gauge block is of relatively simple design and construction, being produced using standard gauge block and calibration weight manufacturing techniques so as to not make each gauge block that form a gauge block set, economically prohibitive. The multi-function gauge block is relatively simple and straightforward to use and maintain.

The multi-function gauge block of the present invention is comprised of a rectangular shaped body member that has a first side face and an opposing second side face, joined by a third side face and an opposing fourth side face. The body member also has a first end that defines a first outside measuring face that is precisely flat and an opposing second end that defines a second outside measuring face that is precisely flat and that is parallel with the first outside measuring face. The body member also has a precisely flat angle face that extends between the first side face and the third side face, between the first end and the second end, such that angle face is bounded by a first inside measuring face that is precisely flat and a second inside measuring face that is precisely flat and that is parallel with the first inside measuring face. The body member has a precise weight (calibration weight). The body member has a through hole extending between the first end and the second end that receives a tie rod therethrough. The body member is made from a low secular variation material which may include hardened steel or a ceramic.

BRIEF DESCRIPTION OF THE DRAWINGS

Similar reference numerals refer to similar parts throughout the several views of the drawings.

DESCRIPTION OF THE PREFERRED EMBODIMENT

Figure 1:
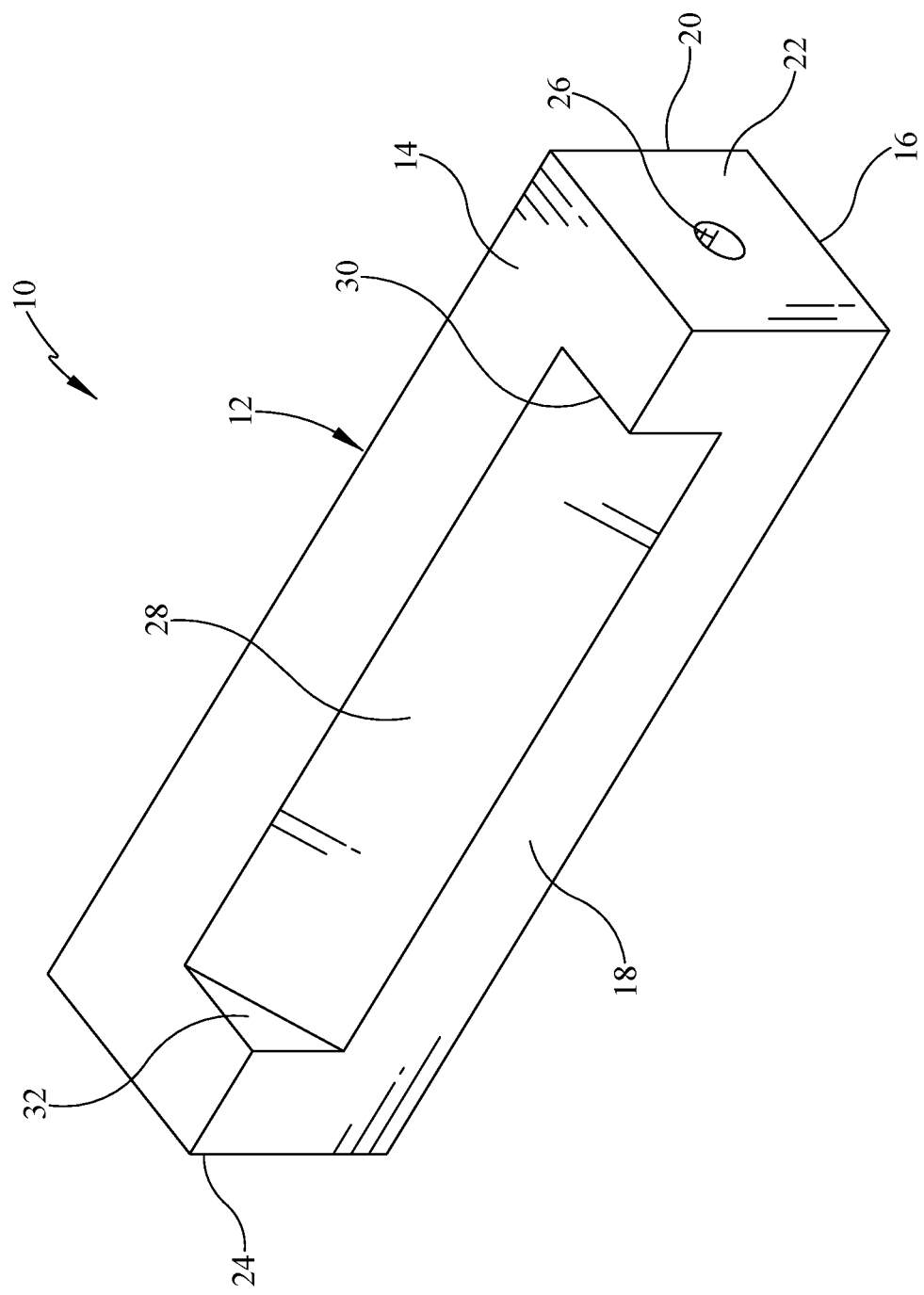
FIG. 1 is a perspective view of the multi-function gauge block of the present invention.
Figure 2:
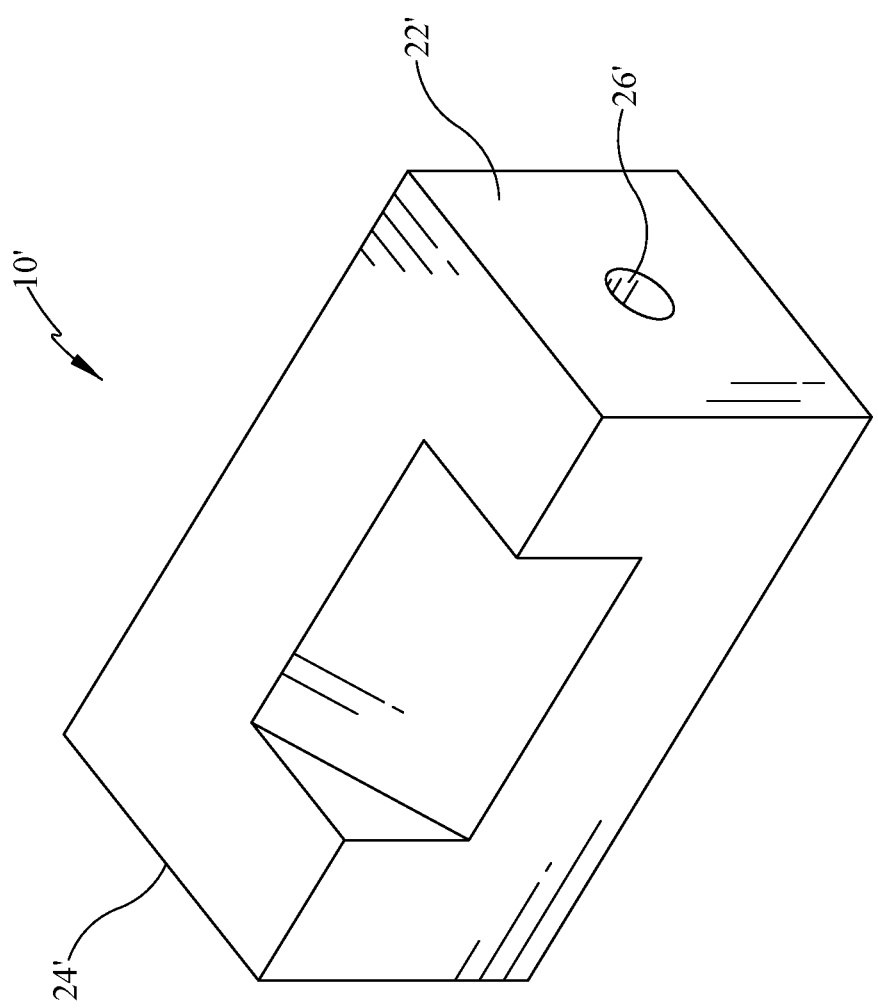
FIG. 2 is a perspective view of another multi-function gauge block of the present invention, that is dimensionally different relative to the multi-function gauge block of FIG. 1, that may form part of a gauge block set along with the multi-function gauge block of FIG. 1 and that can be wrung together with the multi-function gauge block of FIG. 1.
Figure 3:
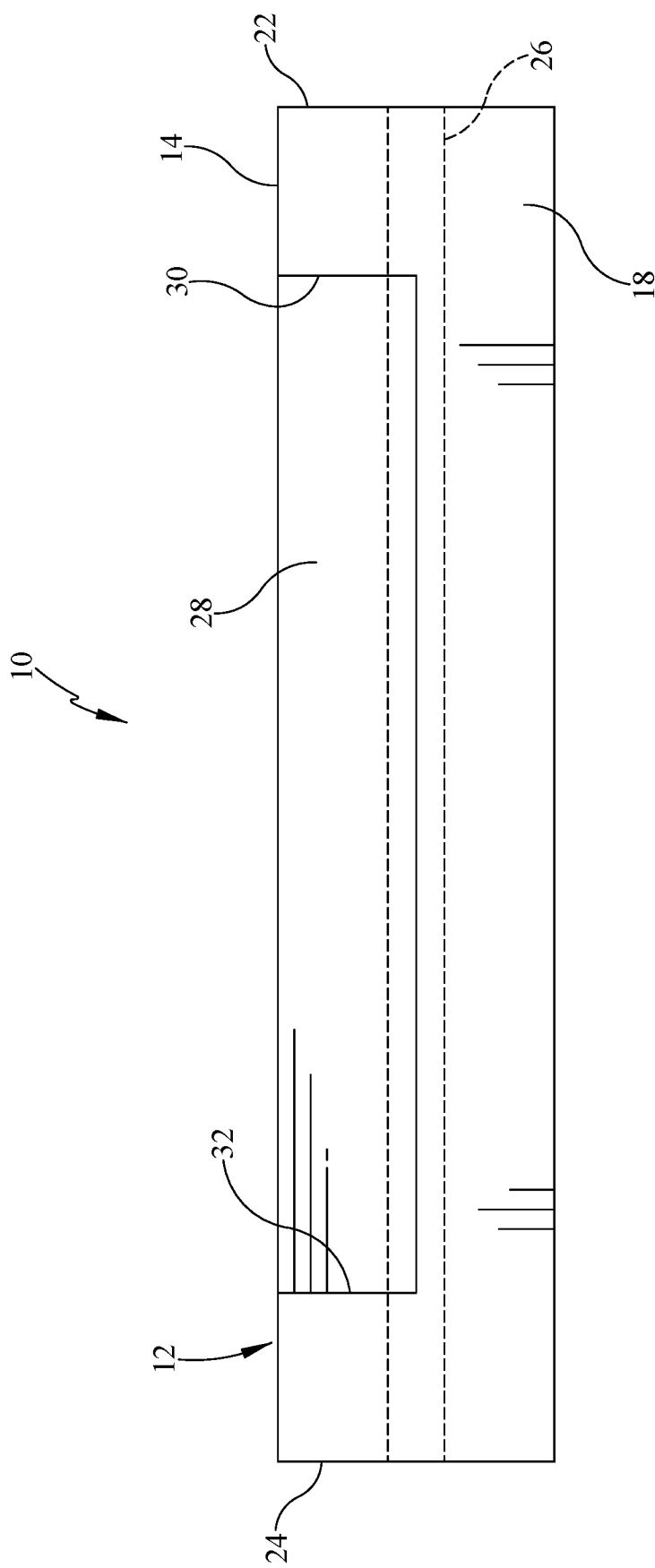
FIG. 3 is a front view of the multi-function gauge block of FIG. 1.
Figure 4:
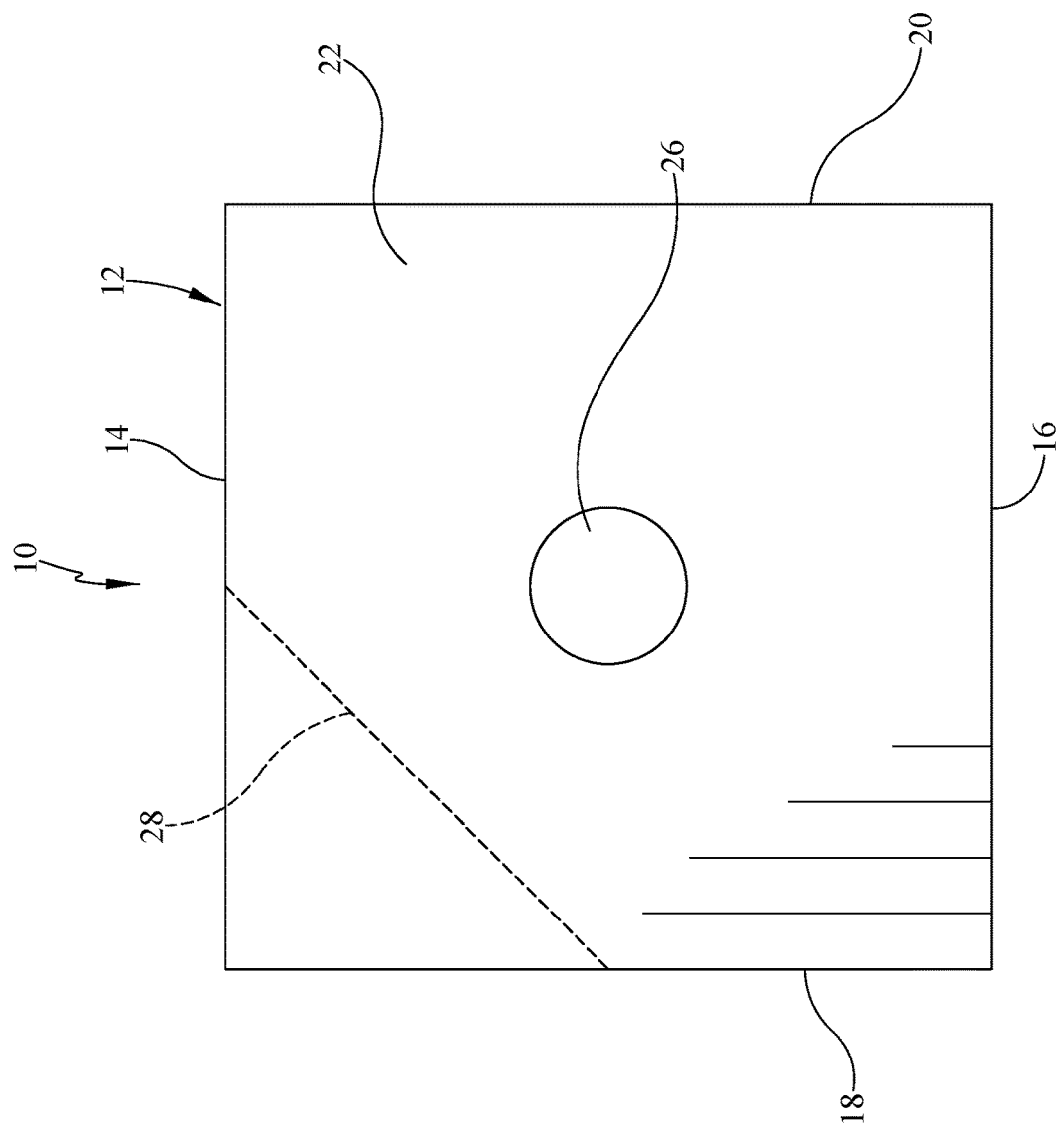
FIG. 4 is an end view of the multi-function gauge block of FIG. 1.
Figure 5:
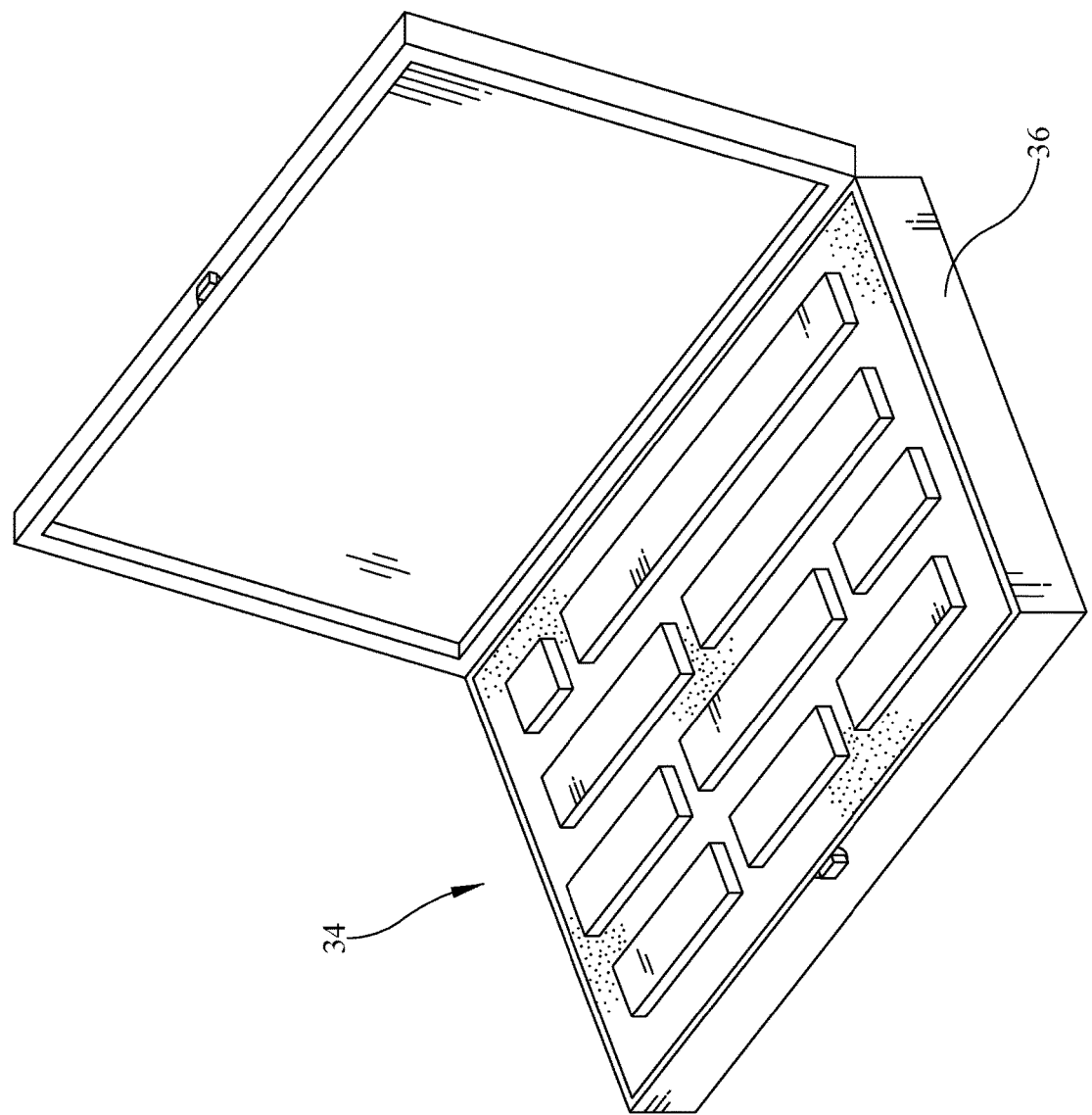
FIG. 5 is a perspective view of a series of multi-function gauge blocks of the present invention, held as a set in a carrying case.

Referring now to the drawings, it is seen that the multi-function gauge block of the present invention, generally denoted by reference numeral 10, is comprised of a substantially rectangular body member 12 made from a gauge block and calibration weight appropriate material such as hardened steel (or possibly a ceramic). The body member 12 has a first side face 14 and an opposing second side face 16, joined by a third side face 18 and an opposing fourth side face 20. Located at one end of the body member 12 is a first outside measuring face 22 and located on the opposing end is a second outside measuring face 24. Measuring face is defined so that each of the two outside measuring faces 22 and 24 are precisely flat and parallel with one another (achieved via grinding and lapping) so that a precision length is established between the two outside measuring faces 22 and 24, per the standards established by the ISO, the ASME, 11. S. Federal Specification GGG-G-15C, or similar standards. Additionally, each measuring face 22 or 24 can be wrung together to the measuring face 22' or 24' of another gauge block 10' (which need not necessarily have the multiple functions of the multi-function gauge block 10 of the present invention) or to a platen (not illustrated) without the need for a wringing film allowance. The body member 12 also has a through hole 26 so that when the multi-function gauge block 10 is wrung together with one or more other gauge blocks 10', a tie-rod (not illustrated) can be inserted through the through holes 26 and 26' of the wrung together gauge blocks.

As seen, a section of the body member 12 is removed between the first side face 14 and the third side face 18 forming an angle face 28 that is precisely flat and is bounded by a first inside measuring face 30 and an opposing second inside measuring face 32. Here, measuring face is defined so that each of the two inside measuring faces 30 and 32 are precisely flat and parallel with one another so that a precision length is established between the two inside measuring faces 30 and 32, which length is obviously less than the length established between the two outside measuring faces 22 and 24, again as per the previously mentioned standards. Additionally, a precise angle is formed between the first side face 14 and/or the third side face 18 and the angle face 28 for allowing the precise measurements of an angle via this feature of the multi-function gauge block 10.

In addition, each multi-function gauge block 10 that forms a set of multi-function gauge blocks 34 has a precise mass. Precise mass is defined herein as a mass that is within an appropriate tolerance of the stated weight under the appropriate conditions as defined as per the standards established by the ASTM (ASI standards) of Conshohocken, Pa., the National Bureau of Standards, the NIST (National Institute of Standards and Technology), or similar standards, allowing the multi-function gauge block 10 to function as a calibration weight.

The length between the outside measuring faces 22 and 24 of the body member 12, the length between the inside measuring faces 30 and 32 of the body member 12, the angular measurement between the angle face 28 and either the first side face 14 and/or the third side face 18 of the body member 12, and the precise weight of the body member 12 can each be appropriately imprinted in the body member 12 (imprinting not illustrated), or can be appropriately labeled in an appropriate location within the carrying case 36 of the gauge block set 34 (labeling not illustrated).

The multi-function gauge block 10 of the present invention can perform numerous functions. The multi-function gauge block 10 can be used for typical length measurements via the outside measuring faces 22 and 24 (either via a single gauge block, or via two or more gauge blocks wrung together) such as calibrating an outside caliper. The multi-function gauge block can be used for outside length measurements via the two inside measuring faces 30 and 32 such as calibrating an inside caliper. The multi-function gauge block 10 can be used for angular measurements via the angle face 28 and either the first outside face 14 or the third outside face 18 such as measuring a protractor or other angular devices. Finally, the gauge block can be used for weight calibration such as calibrating a scale via the precise weight of the multi-function gauge block 10, either individually or with one or more other gauge blocks.

While the invention has been particularly shown and described with reference to an embodiment thereof, it will be appreciated by those skilled in the art that various changes in form and detail may be made without departing from the spirit and scope of the invention.

I claim:

1. A multi-function gauge block comprising a rectangular shaped body member having a first side face and an opposing second side face, joined by a third side face and an opposing fourth side face, the body member also having a first end that defines a first outside measuring face that is precisely flat and an opposing second end that defines a second outside measuring face that is precisely flat and that is parallel with the first outside measuring face, the body member also having a precisely flat angle face that extends between the first side face and the third side face, between the first end and the second end, such that angle face is bounded by a first inside measuring face that is precisely flat and a second inside measuring face that is precisely flat and that is parallel with the first inside measuring face.

2. The multi-function gauge block as in claim 1 wherein the body member has a precise mass.

3. The multi-function gauge block as in claim 2 wherein the body member has a through hole extending between the first end and the second end and adapted to receive a tie rod therethrough.

4. The multi-function gauge block as in claim 1 wherein the body member has a through hole extending between the first end and the second end and adapted to receive a tie rod therethrough.

5. The multi-function gauge block as in claim 1 wherein the body member is made from a low secular variation material.

6. The multi-function gauge block as in claim 5 wherein the material is a hardened steel.

7. The multi-function gauge block as in claim 5 wherein the material is a ceramic.

8. The multi-function gauge block as in claim 5 wherein the material is either a hardened steel or a ceramic.

9. A multi-function gauge block comprising a rectangular shaped body member having a first side face and an opposing second side face, joined by a third side face and an opposing fourth side face, the body member also having a first end that defines a first measuring face that is precisely flat and an opposing second end that defines a second measuring face that is precisely flat and that is parallel with the first outside measuring face, the body member also has a calibration weight that is tuned to a precise mass.

10. The multi-function gauge block as in claim 9 wherein the body member has a through hole extending between the first end and the second end and adapted to receive a tie rod therethrough.

11. The multi-function gauge block as in claim 9 wherein the body member is made from a low secular variation material.

12. The multi-function gauge block as in claim 11 wherein the material is a hardened steel.

13. The multi-function gauge block as in claim 11 wherein the material is a ceramic.

14. The multi-function gauge block as in claim 11 wherein the material is either a hardened steel or a ceramic.

* * * * *